2 Sheets—Sheet 1.
A. G. CHERRY & A. T. ELLIOTT.
GATE.
No. 191,114. Patented May 22, 1877.
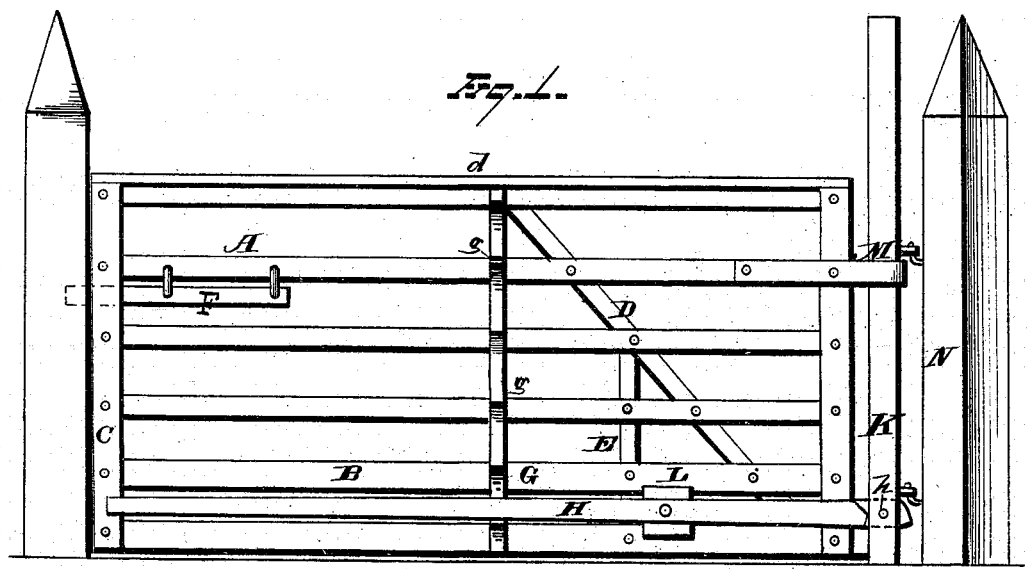
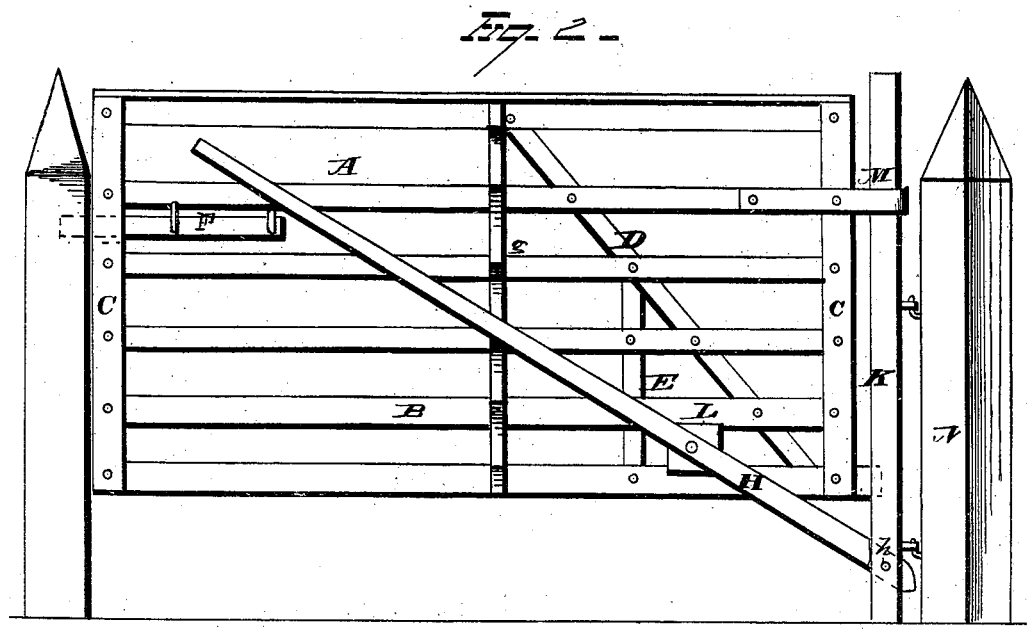
WITNESSES
Ed. I. Nottingham,
A. W. Bright.
INVENTOR
A. G. Cherry
A. T. Elliott 2nd
By H. A. Seymour
ATTORNEY
N. PETERS, PHOTO-LITHOGRAPHER, WASHINGTON, D. C.

2 Sheets—Sheet 2.
A. G. CHERRY & A. T. ELLIOTT.
GATE.
No. 191,114. Patented May 22, 1877.
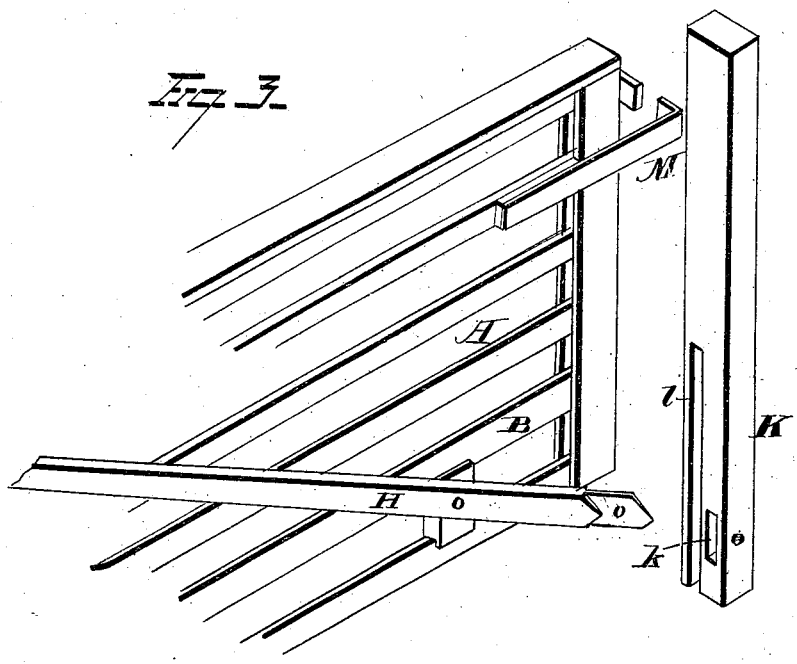

UNITED STATES PATENT OFFICE.

AUSTIN G. CHERRY AND ALVAH T. ELLIOTT, OF STURGIS, MICHIGAN.

IMPROVEMENT IN GATES.

Specification forming part of Letters Patent No. 191,114, dated May 22, 1877; application filed March 19, 1877.

*To all whom it may concern:*

Be it known that we, AUSTIN G. CHERRY and ALVAH T. ELLIOTT, of the village of Sturgis, in the county of St. Joseph and State of Michigan, have invented certain new and useful Improvements in Gates; and we do hereby declare the following to be a full, clear, and exact description of the invention, such as will enable others skilled in the art to which it pertains to make and use it, reference being had to the accompanying drawings, which form part of this specification.

Our invention relates to improvements in gates, and is designed to furnish a simple means whereby the gate may be raised or lowered upon a swinging supporting-post, so that any obstacle, such as a body of snow or other impeding matter to the free movement of the gate upon its hinges may be cleared of contact in the opening or shutting of the gate. By raising the gate, while closed, any suitable distance, room is afforded for chickens or other poultry to pass beneath, or allowing pigs to go out and in, while the hogs or other larger animals are kept within the inclosure. The leverage construction also causes the weight on the free end of the gate to be partly borne by the swinging post, thus preventing the sagging of the gate.

Referring to the drawing, the gate A may be of any desired style or construction; but in order to give greater strength to the same we make it with the ordinary longitudinal bars B, having vertical end supports C and a rear half-diagonal brace-bar, D. *d* is a supplemental strengthening bar along the top of the gate. The short vertical brace E secures together the lower four of bars B, while F is the ordinary latch. Approximately in the longitudinal center of the gate is the vertical lever-supporting bar G, having a series of notched shoulders, *g*, upon which rest the power end of the lever H, as the latter is inclined at different angles, to raise or lower the gate.

The fulcrum of this lever, acting as a lever of the second class, is the pivot *h*, securing the lever within the lower mortise *k* of the supporting-post K, while the application of the weight varies with the movement of the sliding block L, which has free play between the two longitudinal lower bars of the gate, bounded on either transverse side by the braces D and E, respectively. The lower bar B has a rear tenon extension, which has free vertical movement in the grooved way *l* of the post K, while the upper part of the gate is provided with the metallic sliding clasps M, which are also loose about post K. The post K swings upon the main supporting-post N by staple or other suitable hinge, and by operating the lever H the gate is lowered or raised vertically upon the post K. It can thus be raised any distance to allow of its clearing a body of snow or other obstacle, in its swinging to or fro, and can be adjustably regulated to permit sheep and hogs to pass under it, while horses, cattle, and other large stock are barred by it. By the lever-bar transferring a large proportion of the weight of the gate to the swinging post, it is also evident that the gate is kept from sagging at its free end.

Having fully described our invention, what we claim as new, and desire to secure by Letters Patent, is—

An adjustable gate constructed as described, and operated by the lever provided with the sliding block, whereby the gate has vertical movement upon the swinging supporting-post, the two latter being secured together by lower tenon-and-mortise engagement, and the upper metallic sliding clasps, substantially as described.

In testimony that we claim the foregoing we have hereunto set our hands this 16th day of March, 1877.

AUSTIN G. CHERRY.
ALVAH T. ELLIOTT.

In presence of—
VOLNEY KENT,
WILLIAM G. CUMMINS.